(12) United States Patent
Nakajo et al.

(10) Patent No.: US 8,779,664 B2
(45) Date of Patent: Jul. 15, 2014

(54) ORGANIC EL ELEMENT LIGHTING DEVICE AND LIGHTING FIXTURE USING THE SAME

(71) Applicant: Panasonic Corporation, Osaka (JP)

(72) Inventors: Akira Nakajo, Kyoto (JP); Hiroshi Kido, Osaka (JP)

(73) Assignee: Panasonic Corporation, Osaka (JP)

( * ) Notice: Subject to any disclaimer, the term of this patent is extended or adjusted under 35 U.S.C. 154(b) by 118 days.

(21) Appl. No.: 13/673,420

(22) Filed: Nov. 9, 2012

(65) Prior Publication Data

US 2013/0134884 A1    May 30, 2013

(30) Foreign Application Priority Data

Nov. 30, 2011 (JP) .................. 2011-262443

(51) Int. Cl.
*H05B 37/02* (2006.01)
(52) U.S. Cl.
CPC ..................... *H05B 37/02* (2013.01)
USPC .......................... 315/122; 315/297
(58) Field of Classification Search
CPC ..................................... H05B 37/02
USPC ...................... 315/205, 209 R, 122, 297, 307
See application file for complete search history.

(56) References Cited

U.S. PATENT DOCUMENTS

| | | | |
|---|---|---|---|
| 2006/0022305 A1 | 2/2006 | Yamashita | |
| 2011/0193495 A1 | 8/2011 | Mishima et al. | |
| 2012/0249004 A1* | 10/2012 | Kamata et al. | 315/206 |
| 2013/0127366 A1* | 5/2013 | Hayashi et al. | 315/250 |

FOREIGN PATENT DOCUMENTS

| | | |
|---|---|---|
| JP | 2004-279792 A | 10/2004 |
| JP | 2007-093729 A | 2/2007 |
| JP | 2007-265805 A | 10/2007 |
| JP | 2007-265806 A | 10/2007 |
| JP | 2008-015178 A | 1/2008 |
| JP | 4219997 B | 11/2008 |
| JP | 4614713 B | 10/2010 |

OTHER PUBLICATIONS

Extended European Search Report for corresponding European Application No. EP 12 18 9169 dated May 13, 2013.

* cited by examiner

*Primary Examiner* — Don Le
(74) *Attorney, Agent, or Firm* — Renner, Otto, Boisselle & Sklar, LLP (57) ABSTRACT

An object of the present invention is to provide an organic EL element lighting device whereby surge current can be reduced at start-up while controlling start-up variation, along with a lighting fixture using the same. Provided are a current supply part for supplying lighting current to a light source formed of one or more organic EL elements and connected between output terminals of the current supply part, a current detection part for detecting the lighting current, a target setting part for setting a target value of the lighting current, and a control part for performing feedback control of the lighting current by controlling the current supply part so that the detected value of the current detection part matches the target value of the lighting current. The target setting part has a sweep period during which the target value is gradually increased at start-up of the light source.

9 Claims, 8 Drawing Sheets

ORGANIC EL ELEMENT LIGHTING DEVICE AND LIGHTING FIXTURE USING THE SAME

BACKGROUND OF THE INVENTION

1. Field of the Invention

The present invention relates to an organic EL element lighting device, and to a lighting fixture using the same.

2. Description of the Related Art

Conventionally, organic electroluminescent elements (hereunder called organic EL elements) have been used as surface light sources, and organic EL element lighting devices have been provided for lighting up organic EL elements (see for example Japanese Patent Application Publication No. 2007-93729).

Because organic EL elements are surface light sources, organic EL elements have large capacity components, and are liable to strong surge currents at start-up. These surge currents can damage or shorten the lives of organic EL elements and organic EL element lighting devices. In the above document, surge currents are reduced by inserting an inductor or resistor into the pathway of power supply to the organic EL element, but this creates another problem of increased power loss from the inductor or resistor.

Figure 12:
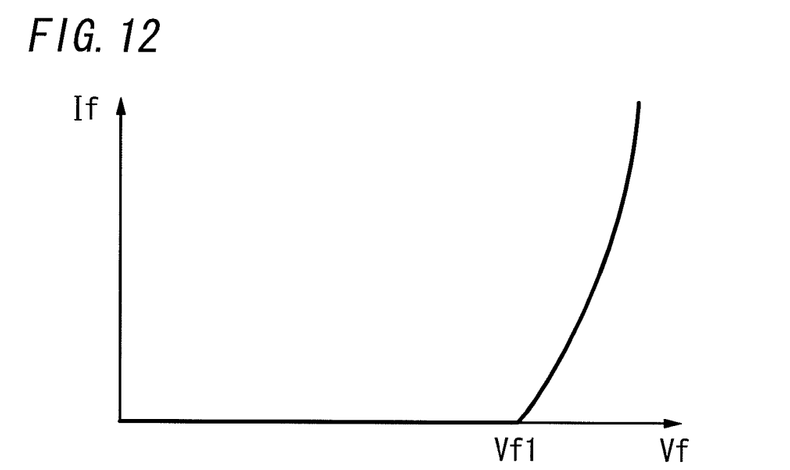
FIG. 12 is a graph showing the V-I properties of an organic EL element.

Moreover, in an organic EL element the forward current "If" properties relative to the forward voltage "Vf" (hereunder called the "V-I properties") as shown in FIG. 12 may vary for each sample or may vary due to environmental factors, such as temperature. As a result, there is a likelihood of start-up variation involving differences in start-up timing and rates of increase in light output. This start-up variation is particularly noticeable when the output voltage is raised gradually, or when fading in during start-up of an organic EL element.

SUMMARY OF THE INVENTION

It is an object of the present invention, which was developed in light of these circumstances, to provide an organic EL element lighting device whereby surge current can be reduced at start-up while controlling start-up variation, along with a lighting fixture using the same.

An organic EL element lighting device of the present invention comprises a current supply part that supplies lighting current to a light source which is formed of one or more organic EL elements and is connected between output terminals of the current supply part, a current detection part that detects the lighting current, a target setting part that sets a target value of the lighting current, and a control part that is configured to perform feedback control of the lighting current by controlling the current supply part so that a detected value of the current detection part matches the target value, and the target setting part has a sweep period during which the target value is gradually increased at start-up of the light source.

In this organic EL element lighting device, the current detection part is preferably provided with a lowpass filter that lets through the detected value of the lighting current.

In this organic EL element lighting device, the current supply part preferably comprises a plurality of current supply parts, each of which supplying the lighting current to a different light source, the control part is configured to perform feedback control to match each lighting current to the target value, and the target setting part sets the same target value for each lighting current.

This organic EL element lighting device is preferably further provided with a plurality of lighting units, each of which having the light source, the current supply part and the control part, wherein the current supply part generates the lighting current from an input power source, and each of the plurality of lighting units is preferably provided with a supply terminal that is freely detachable from the input power source, and a target value input terminal that is freely detachable from the target setting part.

In this organic EL element lighting device, the light source preferably comprises a plurality of light sources connected in series, and the organic EL element lighting device is preferably further provided with short/open circuit means for shorting and opening circuits between both terminals of each of the plurality of light sources.

In this organic EL element lighting device, the target setting part preferably shortens the sweep period as the number of the organic EL elements supplied with the lighting current decreases.

In this organic EL element lighting device, the target setting part preferably shortens the sweep period as a degree of modulation of the light source becomes lower.

In this organic EL element lighting device, the control part preferably has, before the sweep period, a period during which a voltage at or below a lighting initiation voltage of each of the organic EL elements is generated across the output terminals of the current supply part.

A lighting fixture of the present invention comprises any one of the abovementioned organic EL element lighting devices, a light source which is formed of one or more organic EL elements and is lit by the organic EL element lighting device, and a fixture body to which are attached the organic EL element lighting device and the light source.

As explained above, the present invention has the effect of allowing surge current to be reduced at start-up and allowing start-up variation to be reduced.

BRIEF DESCRIPTION OF THE DRAWINGS

Preferred embodiments of the invention will now be described in further details. Other features and advantages of the present invention will become better understood with regard to the following detailed description and accompanying drawings where.

DETAILED DESCRIPTION OF EXEMPLARY EMBODIMENTS

Embodiments of the present invention are explained below based on the drawings.

Embodiment 1

Figure 1:
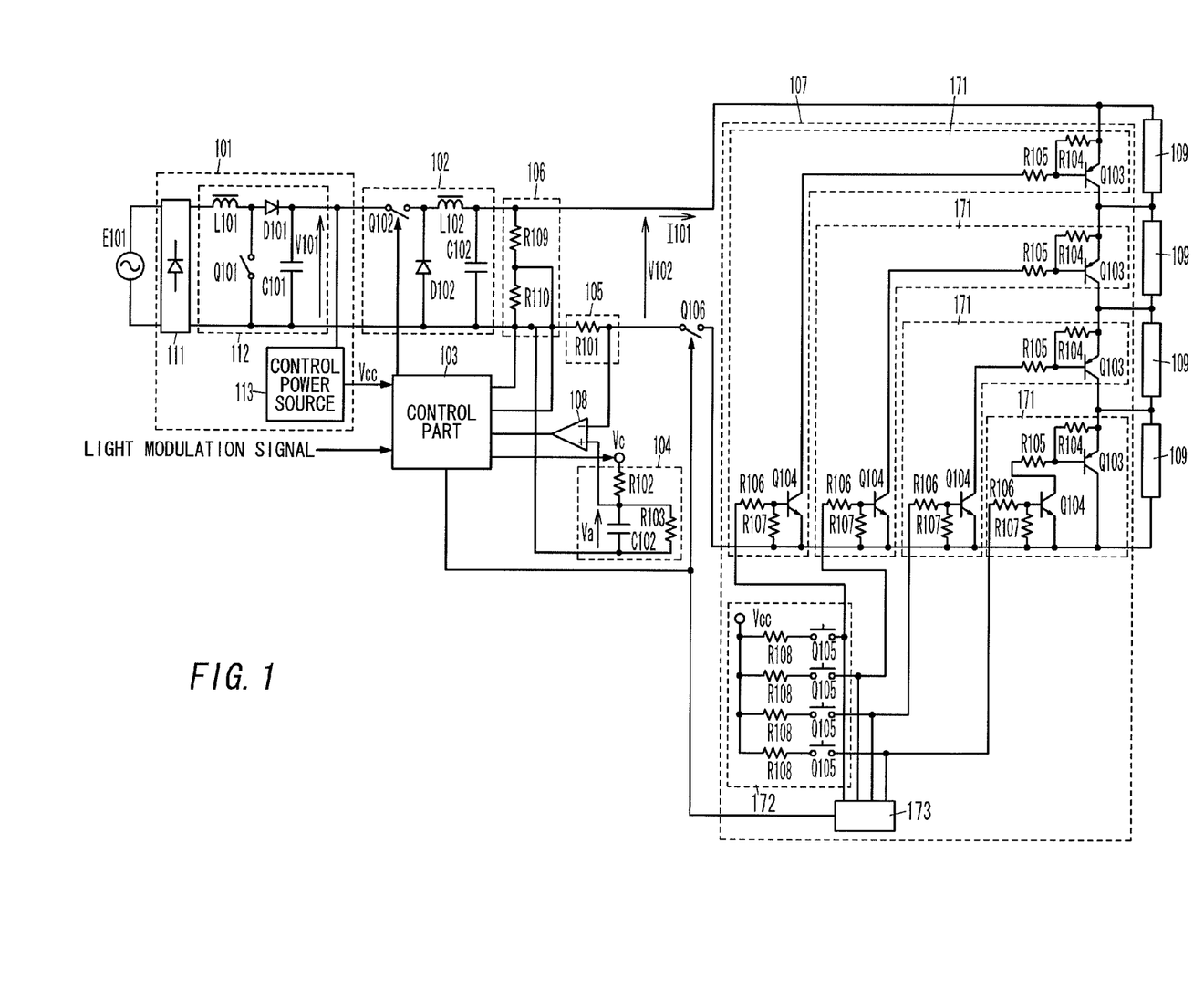
FIG. 1 is a circuit configuration diagram of an organic EL element lighting device of Embodiment 1 of the present invention.

FIG. 1 shows a circuit configuration diagram of an organic EL element lighting device of the present embodiment. The organic EL element lighting device of the present embodiment includes a power source 101, a current supply part 102, a control part 103, a target setting part 104, a current detection part 105, a voltage detection part 106 and a short/open circuit 107, and lights up a plurality (four in this example) of light sources 109 that are connected in series. The light sources 109 are all of the same kind and size.

The power source 101 includes a rectifying circuit 111, a boost chopper circuit 112 and a control power source 113. The rectifying circuit 111, which is connected between output terminals of an AC power source E101, rectifies and smooths the AC voltage and outputs the resulting voltage to the boost chopper circuit 112. The boost chopper circuit 112 includes an inductor L101, a diode D101, a capacitor C101 and a switching element Q101. A series circuit formed of the inductor L101, the diode D101 and the capacitor C101 is connected to the output terminal of the rectifying circuit 111, and the switching element Q101 is connected in parallel to a series circuit formed of the diode D101 and the capacitor C101. The switching element Q101 is turned on and off by a switching control part (not shown), thereby boosting the output voltage of the rectifying circuit 111 and generating a voltage V101 across both terminals of the capacitor C101. The boost chopper circuit 112 then outputs the voltage V101 to the current supply part 102 and the control power source 113. The control power source 113 performs DC-DC conversion of the voltage V101, thereby generating drive voltage Vcc as a working power source for the control part 103, and outputs the drive voltage Vcc to the control part 103.

In the current supply part 102, a switching element Q102, a diode D102, an inductor L102 and a capacitor C102 constitute a step-down chopper circuit. A series circuit formed of the switching element Q102, inductor L102 and capacitor C102 is connected between output terminals of the boost chopper circuit 112, and the diode D102 for regeneration is connected in parallel to the inductor L102 and capacitor C102. The switching element Q102 is turned on and off by the control part 103, thereby stepping down the voltage V101 and generating a lighting voltage V102 across both terminals of the capacitor C102.

Four serially-connected light sources 109 are connected in parallel to the capacitor C102. Each light source 109 includes one or more organic EL elements, and is lit up when the lighting current I101 is supplied from the current supply part 102.

The control part 103 performs feedback control of the lighting current I101 by controlling the current supply part 102 so that the lighting current I101 matches a target value.

The current detection part 105 includes a resistor R101 which is inserted into the supply pathway of the lighting current I101. The voltage generated across the two terminals of the resistor R101 is outputted to the inverting input terminal of a comparator 108 as the detected value of the lighting current I101.

The target setting part 104 sets the target value for the lighting current I101. The target setting part 104 includes a series circuit formed of a resistor R102 and a capacitor C102, and a resistor R103, which is connected in parallel to the capacitor C102. One end of the series circuit of the resistor R102 and the capacitor C102 is connected to the control part 103, while the other end is connected to the negative pole of the capacitor C102, and receives a control voltage Vc from the control part 103. The capacitor C102 is charged by this control voltage Vc, and a capacitor voltage Va is generated across both terminals of the capacitor C102. The connection point between the resistor R102 and the capacitor C102 is connected to the non-inverting input terminal of the comparator 108, and the capacitor voltage Va is outputted as the target value for the lighting current I101.

The control part 103 turns the switching element Q102 on and off based on the output of the comparator 108, thereby performing feedback control on the lighting current I101 so that the detected value of the lighting current I101 matches the target value.

Next, the start-up operations of the organic EL element lighting device of the present embodiment are explained.

Figure 2:
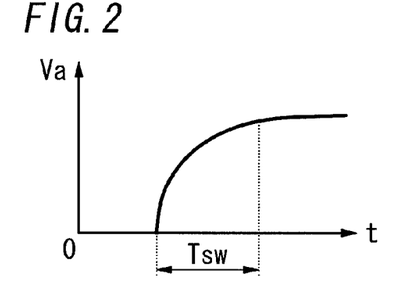
FIG. 2 is a graph showing the increase in capacitor voltage Va.

When power is supplied from the AC power source E101, the control power source 113 generates a drive voltage Vcc, and outputs the voltage Vcc to the control part 103. This starts to drive the control part 103, generating a control voltage Vc, which is outputted to the target setting part 104. Then, as shown in FIG. 2, the voltage across both ends of the capacitor C102 (capacitor voltage Va) rises gradually according to the resistance values of the resistors R102 and R103 and a time constant determined by the capacity of the capacitor C102. That is, the target setting part 104 has a sweep period Tsw during which the target value of the lighting current I101 is gradually increased. Since the control part 103 performs feedback control of lighting current I101, the lighting current I101 supplied to the light sources 109 gradually increases, and the light sources 109 are lit up. The resistance values of the resistors R102 and R103 and the voltage value of the control voltage Vc are set so that the capacitor voltage Va upon completion of charge becomes the target value of lighting current I101 during steady lighting.

Figure 3:
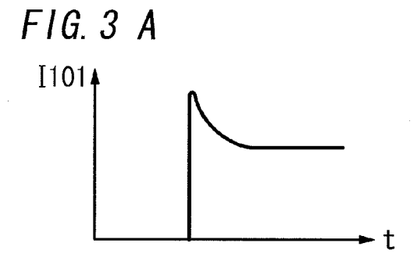
FIG. 3A is a graph showing the initial rise in conventional lighting current I101.
FIG. 3B is a graph showing the initial rise in conventional lighting voltage V102.
Figure 4:
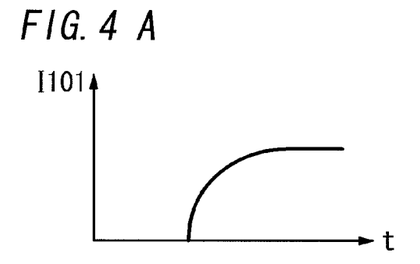
FIG. 4A is a graph showing the initial rise in the lighting current I101 of Embodiment 1 of the present invention.
FIG. 4B is a graph showing the initial rise in the lighting voltage V102 of Embodiment 1 of the present invention.

That is, when light sources 109 are lit up at start-up in the present embodiment, the lighting current I101 supplied to light sources 109 is gradually increased by gradually increasing the target value of the lighting current I101. In the conventional organic EL element lighting device, as shown in FIG. 3A, because the target value of the lighting current I101 is already set at the target value during steady lighting immediately after start-up, lighting current I101 rises steeply, thereby generating surge current. In the present embodiment, however, as shown in FIG. 4A, the target value of the lighting current I101 immediately after start-up is set low, and is then gradually increased to the target value during steady lighting, making the rise in lighting current I101 smoother and controlling the occurrence of surge current. This is particularly effective when using loads with large capacity components, as is the case with the organic EL elements of light sources 109. Moreover, because surge current is suppressed in the present embodiment, no inductor components or resistor components are interposed, and there is no risk of increased power loss.

In the conventional organic EL element lighting device, moreover, the lighting voltage V102 applied to the series circuit of light source 109 also rises steeply as shown in FIG. 3B, and there is a risk of voltage overshoot. In the present embodiment, however, as shown in FIG. 4B, the rise in lighting voltage V102 is also smooth, and voltage overshoot is controlled.

Moreover, in the present embodiment, the lighting current I101 supplied to the light sources 109 is increased gradually by gradually increasing the target value of lighting current I101. Since forward current and light output are roughly proportional in organic EL elements, gradually increasing the lighting current I101 serves to control the start-up timing and start-up variation in the rate of increase in light output, resulting in stable output control.

That is, not only is surge current reduced by performing feedback control of the lighting current I101 so that the lighting current I101 rises gradually at start-up, but the effect of controlling start-up variation is also obtained.

Control part 103 may also apply drive voltage Vcc from the control power source 113 directly to the target setting part 104 as control voltage Vc. When performing light modulation control of the light sources 109 in response to a light modulation signal inputted from outside the device, the control part 103 changes the control voltage Vc in accordance with the degree of light modulation indicated by the light modulation signal. Thus, since the capacitor voltage Va after sweep period Tsw (after completion of charge of the capacitor C102) is variable, the target value of the lighting current I101 during steady lighting can be adjusted, thereby performing light modulation control of light sources 109.

When the degree of light modulation is set low during steady lighting, the lighting current I101 is reduced, and lighting voltage V102 is also lower, reducing the risk of surge current during start-up. Thus, in the present embodiment, the target setting part 104 shortens sweep period Tsw based on a light modulation signal as the degree of modulation becomes lower during steady lighting. It is thus possible to reduce the time taken from initial start-up until a steady lighting state is reached.

A means for shortening sweep period Tsw includes the resistors R102 and R103 that are constituted by variable resistors, and varies the resistance values of resistors R102 and R103 based on the light modulation signal, or controls the current value supplied from the control part 103 to the capacitor C102. Further, as another possibility, there is also a graduated system whereby a specific sweep period Tsw is set for a predetermined degree of modulation or greater, while a sweep period Tsw of zero is set for less than the predetermined degree of modulation. One method of setting a sweep period Tsw of zero is to short-circuit the terminals of the capacitor C102. The sweep period Tsw can also be determined based on the value of the lighting voltage V102 rather than on the degree of modulation shown by the light modulation signal. The sweep period Tsw can also be controlled not only for light modulation purposes, but also to adjust or correct the light output. In this case, the sweep period Tsw is altered based on an adjustment/correction signal.

Cases in which the number of light sources 109 to be lit up is reduced by thinned-out control or removal are explained next.

In the present embodiment, a short/open circuit 107 (short/open means) is provided which is formed of a switch 171 connected to each light source 109, a remote control unit 172 controlling each switch 171, and a state detector 173 for monitoring the state of each switch 171.

Each switch 171 is provided with a switching element Q103, a series circuit comprising partial resistors R104 and R105 connected to the switching element Q103, a switching element Q104, and a series circuit comprising partial resistors R106 and R107 connected to the switching element Q104.

Switching elements Q103 includes PNP bipolar transistors, each of which is connected in parallel to a light source 109. Specifically, the emitter is connected to the high-potential side of the light source 109, and the collector is connected to the low-potential side of the light source 109. One end of the partial resistor R104 is connected to the emitter of the switching element Q103, and the other end is connected to the base of the switching element Q103.

Switching elements Q104 includes NPN bipolar transistors. The collector of each switching element Q104 is connected to the base of a switching element Q103 via a resistor R105, and the emitter is connected to the negative terminal of the capacitor C102 via switching elements Q106 and the resistor R101. One end of each partial resistor R107 is connected to the base of a switching element Q104, and the other end is connected to the emitter of the switching element Q104.

The resistance values of the partial resistors R104 and R105 are set so that the switching element Q103 is also on when the switching element Q104 is on.

A remote control unit 172 is provided in a place that is accessible to user. The remote control unit 172 is provided with the number of operating switches Q105 corresponding to the number of switches 171 (four in the drawing), and four resistors R108, each of which is connected between the control power source 113 and one end of each operating switch Q105. The other end of each operating switch Q105 is connected to a resistor R106.

Push button switches or the like are used for the operating switches Q105, and are operated by a user. When an operating switch Q105 is turned on, the drive voltage Vcc is distributed by the corresponding partial resistors R106 and R107 and the distributed voltage is applied to the base of the corresponding switching element Q104. Thereby, the corresponding switching element Q104 is turned on. When the switching elements Q104 are turned on, the corresponding switching elements Q103 also turn on as discussed above, short-circuiting both ends of the corresponding light source 109 and extinguishing the corresponding light sources 109. That is, the lighting and extinguishing of each light source 109 can be controlled by operating the corresponding operating switch Q105, creating a short or open circuit between both ends of the light source 109 corresponding to the operating switch Q105. The on and off control of the operating switches Q105 may also be performed by switch control parts (not shown). In this case, the switch control parts turn the operating switches Q105 on and off in response to lighting control signals inputted from outside the device.

The light sources 109 are also freely detachable from the organic EL element lighting device, and the attachment or removal of light sources 109 is detected from the mechanical connection (attachment detection switch or the like). When a light source 109 is removed, a switch control part (not shown) turns off the operating switch Q105 corresponding to the removed light source 109. Lighting current I101 can thus be supplied to light up the remaining light sources 109 via switching elements Q103.

By detecting the voltage at one end of each operating switch Q105, the state detector 173 monitors the number of light sources 109 to be lit up. The smaller the number of light sources 109 to be lit up, the smaller the surge current, and the lower the circuit stress on the organic EL element lighting device. In the present embodiment, therefore, the target setting part 104 reduces the sweep period Tsw as the number of light sources 109 to be lit up decreases. The method described above is used for controlling sweep period Tsw. It is thus possible to reduce the amount of time taken from initial start-up until a steady lighting state is reached.

When all light sources 109 have been extinguished or removed and the device is in a load short state, the state detector 173 detects this state and outputs a stop signal to the control part 103. The control part 103 then maintains the switching elements Q102 in an off state. This stops the supply of lighting current I101 so that circuit damage can be prevented. The state detector 173 can also be configured to, upon detecting a load short state, turn off the switching elements Q106 and block the supply pathway of lighting current I101. In this case, reliability and stability are improved because protection operations can be performed instantaneously without considering the discharge time of the capacitor C102 of the current supply part 102. The device can also be configured to detect load short states using the detected values of the current detection part 105 rather than the state detector 173. In this case, the switching elements Q102 or the switching elements Q106 are turned off when the detected value of the current detection part 105 reaches a certain value or greater.

Since the lighting current I101 is subject to feedback control in the present embodiment, moreover, excess voltage is not applied to the light sources 109, and damage to the light sources 109 can be prevented even when the number of the light sources 109 to be lit up is reduced.

The organic EL element lighting device of the present embodiment is also provided with a voltage detection part 106 for detecting lighting voltage V102. The voltage detection part 106 includes a series circuit formed of resistors R109 and R110, and is connected in parallel to the capacitor C102. The partial value of the lighting voltage V102 from the resistors R109 and R110 is outputted to the control part 103 as the detected value of the lighting voltage V102. When the value detected by the voltage detection part 106 reaches a certain threshold or greater, the controller 103 diagnoses an abnormal state and protects the device by stopping the on/off drive of the switching elements Q102.

The current supply part 102 of the present embodiment includes a step-down chopper circuit, but this is not a limitation. For example, the current supply part 102 may include a boost chopper circuit, a boost/step down chopper circuit, a flyback converter, a forward converter, a half bridge converter, a full bridge converter, a push-pull converter or another switching power source, or of a combination of these. The switching frequency is set to tens of kz to a few MHz.

The target setting part 104 may be constituted by a microcomputer, and programmed to gradually increase the target value of lighting current I101.

Embodiment 2

Figure 5:
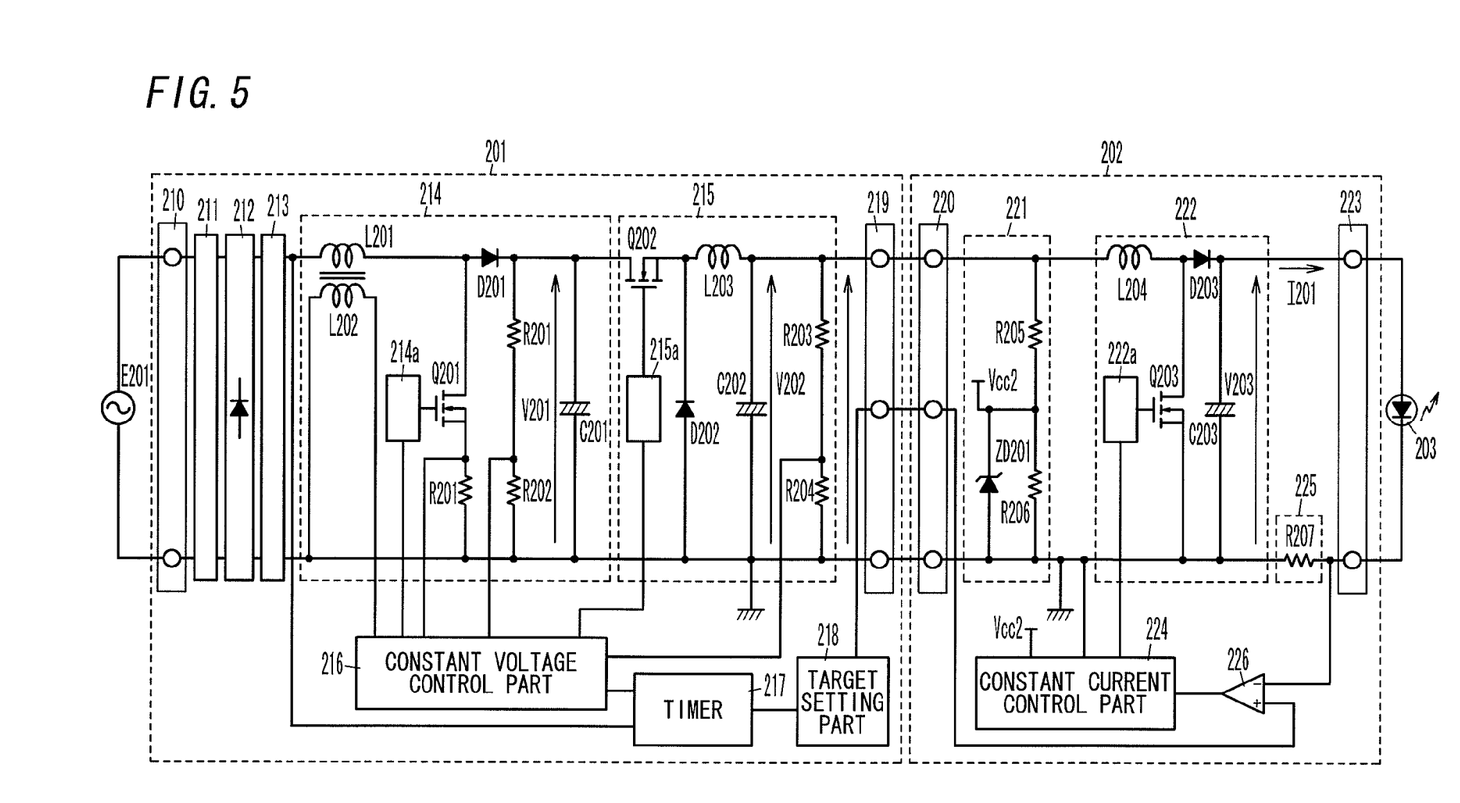
FIG. 5 is a circuit configuration diagram of an organic EL element lighting device of Embodiment 2 of the present invention.

FIG. 5 shows a circuit configuration diagram of an organic EL element lighting device of the present embodiment. The organic EL element lighting device of the present embodiment includes a constant voltage unit 201 and a constant current unit 202. Using input from an AC power source E201, the constant voltage unit 201 generates a specific voltage V202, which is outputted to the constant current unit 202. Using the voltage V202 as input, the constant current unit 202 supplies a lighting current I201 to a light source 203, thereby lighting up the light source 203.

The constant voltage unit 201 (input power source) has an input part 210, a lowpass filter 211, a rectifying circuit 212, a control power circuit 213, a boost chopper circuit 214, a step-down chopper circuit 215, a constant voltage controller 216, a timer 217, a target setting part 218 and an output part 219.

The input part 210 is connected to AC power source E201, and the lowpass filter 211 converts the AC voltage from the input part 210 into sinusoidal form by excluding the high-frequency component. The rectifying circuit 212 uses a diode bridge to perform full-wave rectification of the AC voltage from the lowpass filter 211. The control power circuit 213, which is connected to the output of the rectifying circuit 212, generates a drive voltage Vcc1 and supplies the drive voltage Vcc1 to the boost chopper circuit 214.

The boost chopper circuit 214 has a choke coil L201, a switching element Q201 formed of an n-channel MOSFET, a diode D201, a resistor R201, a capacitor C201, and a drive circuit 214a that drives the switching element Q201. The choke coil L201, diode D201 and capacitor C201 form a series circuit, which is connected between the output terminals of the control power circuit 213. A series circuit formed of the switching element Q201 and the resistor R201 is also connected in parallel to a series circuit formed of the diode D201 and the capacitor C201. The switching element Q201 is turned on and off by the drive circuit 214a, thereby raising the drive voltage Vcc1 and generating a voltage V201 across both ends of the capacitor C201.

A secondary side coil L202, which is joined to the choke coil L201, is connected at one end to the constant voltage controller 216, while the other end is grounded. The voltage generated in the choke coil L201 is detected, and a control power voltage is supplied to the constant voltage controller 216. A series circuit formed of the resistors R201 and R202 is connected in parallel to the capacitor C201, and the partial value of the voltage V201 from the resistors R201 and R202 is outputted to the constant voltage controller 216 as the detected value of voltage V201.

The constant voltage controller 216 controls drive circuit 214a and performs switching control of switching element Q201 so as to achieve a specific value of voltage V201, thereby performing feedback control of voltage V201.

Step-down chopper circuit 215 has a switching element Q202, a choke coil L203, a capacitor C202, a diode D202 and a drive circuit 215a. A series circuit formed of the switching element Q202, the choke coil L203 and the capacitor C202 is connected between both ends of the capacitor C201, while the diode D202 for regeneration is connected in parallel to a series circuit formed of the choke coil L203 and the capacitor C202. The drive circuit 215a turns the switching element Q202 on and off, thereby stepping down the voltage V201 and generating the voltage V202 across both ends of the capacitor C202.

A series circuit formed of the resistors R203 and R204 is also connected in parallel to the capacitor C202, and the partial value of the voltage V202 from the resistors R203 and R204 is outputted to the constant voltage controller 216 as the detected value of the voltage V202.

The constant voltage controller 216 performs feedback control of the voltage V202 by controlling the drive circuit 215a so as to achieve a specific value of the voltage V202, and performing switching control of the switching element Q202.

The output part 219 is provided with supply terminals connected to the positive and negative terminals of the capacitor C202, and each supply terminal is connected to a supply terminal provided at the input part 220 of the constant current unit 202.

That is, the constant voltage unit 201 generates voltage V202 using input from the AC power source E201, and supplies the voltage V202 to the constant current unit 202.

Next, the constant current unit 202 is explained. The constant current unit 202 has an input part 220, a control power circuit 221, a boost chopper circuit 222 (current supply part), an output part 223, a constant current controller 224 (control part), a current detection part 225 and a comparator 226.

The input part 220 is provided with a pair of supply terminals connected to a pair of supply terminals on the output part 219, and voltage V202 is applied between the supply terminals. The control power circuit 221 includes a series circuit formed of the resistors R205 and R206 and a zener diode ZD201 connected in parallel to resistor R206, generates a drive voltage Vcc2 from the voltage V202 as a drive power source for the constant current controller 224, and supplies the drive voltage Vcc2 to the constant current controller 224.

The boost chopper circuit 222 has a choke coil L204, a switching element Q203, a diode D203, a capacitor C203 and a drive circuit 222a. A series circuit formed of the choke coil L204, the diode D203 and the capacitor 203 is connected between both ends of the capacitor C202 via the output part 219 and input part 220, and the switching element Q203 is connected in parallel to a series circuit formed of the diode D203 and the capacitor C203. The drive circuit 222a turns the switching element Q203 on and off, thereby raising the voltage V202 and generating a voltage V203 across both ends of the capacitor C203.

The output part 223 is provided with a pair of output terminals connected to the positive and negative terminals of the capacitor C203, and a light source 203 comprising one or more organic EL elements is connected between these output terminals. The light source 203 is lit up when the lighting current I201 is supplied to the light source 203 from the boost chopper circuit 222 via the output part 223.

A current detection part 225 is also provided for detecting the lighting current I201. The current detection part 225 includes a resistor R207, and is inserted into the supply pathway of the lighting current I201. The voltage across both ends of the resistor R207 is outputted to the inverting input terminal of the comparator 226 as the detected value of the lighting current I201.

The constant voltage unit 201 is provided with a target setting part 218, which sets the target value of the lighting current I201. The output part 219 is provided with a target value output terminal that connects to the target setting part 218, while the input part 220 is provided with a target value input terminal that connects to the non-inverting input terminal of the comparator 226. When the output part 219 and the input part 220 are connected, the target value output terminal is connected to the target value input terminal, and the target value of the lighting current I201 is outputted from the target setting part 218 to the non-inverting input terminal of the comparator 226.

The constant current controller 224 performs switching control of the switching element Q203 and performs feedback control of the lighting current I201, by controlling the drive circuit 222a based on the output from the comparator 226 so that the detected value of the lighting current I201 matches the target value.

At start-up, the target setting part 218 is configured so as to gradually increase the target value of the lighting current I201. The timing for the target setting part 218 to initiate the increase in the target value is determined by the timer 217.

Figure 6:
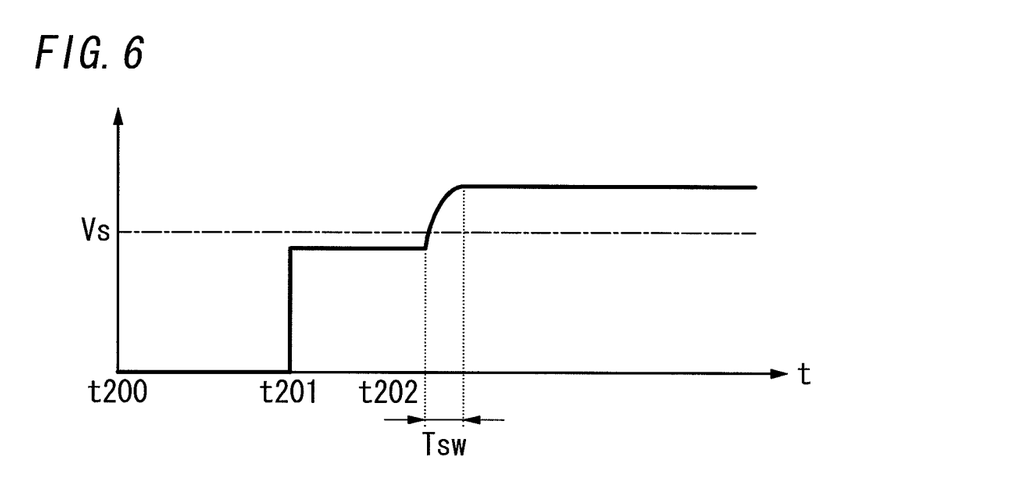
FIG. 6 is a graph showing voltage applied to a light source 203.

Next, the start-up operations of the organic EL element lighting device of the present embodiment are explained using FIG. 6. A power source is powered up at time t200, and when the control power circuit 213 outputs drive voltage Vcc1, the timer 217 starts to count. At time t201, the timer 217 indicates the start of operations to the constant voltage controller 216. The constant voltage controller 216 then initiates switching control of the switching elements Q201 and Q202, generating voltage V202, which is supplied to the constant current unit 202.

At this time, the timer 217 has not yet indicated the start of operations to the target setting part 218, and the target value of the lighting current I201 is still 0. As a result, the operations of the boost chopper circuit 222 are in a shutdown condition. However, since the input and output sides of the boost chopper circuit 222 are not insulated, voltage V202 is still applied to the light source 203 via the boost chopper circuit 222.

At this time, the constant voltage controller 216 performs feedback control so that the voltage V202 is at or below the lighting initiation voltage Vs of the light source 203. That is, the feedback control of the voltage V202 is performed so that the voltage applied to the organic EL element constituting the light source 203 is at or below the lighting initiation voltage Vf1 of the organic EL element (see FIG. 12). Thus, the light source 203 is in an unlit state.

At time t202, the timer 217 indicates start of operation to the target setting part 218, and the target setting part 218 initiates an increase in the target value of the lighting current I201. The target setting part 218 gradually increases the target value of the lighting current I201 from zero to the target value during steady lighting (sweep period Tsw). Since the constant current controller 224 performs feedback control so that the detected value of the lighting current I201 matches the target value, the lighting current I201 rises gradually, and light source 203 is lit up.

As shown in FIG. 12, in the organic EL element, the lighting initiation voltage Vf1, at which a current begins to flow, has a somewhat high voltage value. Thus, even if the lighting current I201 is raised gradually at start-up, there is a risk that the voltage rises sharply to the lighting initiation voltage Vf1, thereby producing a flow of inrush current (surge current) to charge the capacity component of the organic EL element. In the present embodiment, however, a period (time t201 to r202) is provided during which a voltage at or below the lighting initiation voltage Vs of the light source 203 is applied to the light source 203 before the light source 203 is lit up, so that the capacity component of the organic EL element is already charged to a certain extent. It is thus possible to reduce inrush current (surge current) during lighting initiation. The closer the voltage V202 comes to the lighting initiation voltage Vs, the greater the surge reduction effect, and surge current can be most effectively reduced by performing feedback control so that voltage V202 matches the lighting initiation voltage Vs.

Since feedback control of lighting current I201 is performed during start-up of the light source 203 so that lighting current I201 rises gradually, moreover, it is also possible to reduce start-up variation as in Embodiment 1. Even during steady lighting, variation in light output due to variation in the V-I characteristics caused by the ambient temperature and solid differences can be suppressed by feedback control of the lighting current I201.

Thus, the effects of further reducing surge current during start-up and of suppressing start-up variation can be obtained by the present embodiment.

Moreover, the organic EL element lighting device of the present embodiment is also configured so that a voltage at or below the lighting initiation voltage Vs can be applied to the light source 203 using the constant voltage unit 201 before start-up. As a result, there is no need to provide a separate source circuit for applying the voltage at or below the lighting initiation voltage Vs to light source 203, and the component count and device size can be reduced.

Since the constant current unit 202 performs feedback control of the lighting current I201 after lighting, the voltage V202 may be controlled so that the voltage V202 is higher than lighting initiation voltage Vs. The output current of the constant voltage unit 202 can be lowered and power consumption can be reduced by raising the voltage V202.

The step-down chopper circuit 215 of the constant voltage unit 201 is configured as a non-insulated step-down chopper circuit, but may also be configured as an insulated step-down chopper circuit using a transformer.

At time t201, the voltage V202 may be made to rise sharply as shown in FIG. 6, or to rise smoothly. Making the voltage V202 rise sharply is a way of reducing the start-up time, while making the voltage V202 rise smoothly is a way of suppressing surge current due to application of the voltage V202 to the light source 203.

Figure 7:
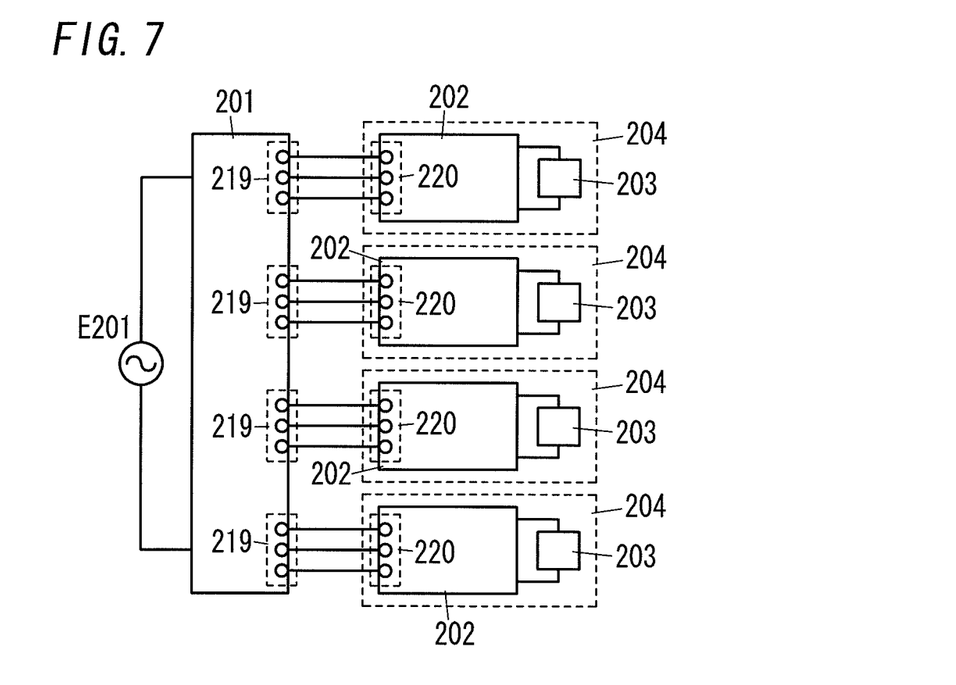
FIG. 7 is a schematic view of an organic EL element lighting device capable of multiple lighting control of Embodiment 2 of the present invention.

Moreover, as shown in FIG. 7, the constant voltage unit 201 can be provided with a plurality of (four in the figure) output parts 219, each of which is connected to a constant current unit 202 to provide an organic EL element lighting device capable of multiple lighting control. In this organic EL element lighting device, each lighting unit 204 includes a constant current unit 202 and a light source 203. The output parts 219 of the constant voltage unit 201 are detachable from the input parts 220 of the constant current unit 202, allowing the lighting units 204 to be removed or exchanged.

Feedback control of the lighting current I201 is also performed for each lighting unit 204. The target setting part 218 of the constant voltage unit 201 provides each lighting unit 204 with the same target value for lighting current I201. As a result, it is possible to control start-up variation in the light sources 203 between the lighting units 204.

Moreover, since the constant voltage unit 201 is used in common so as to output the voltage V202 to all constant current units 202, the component count and device size can be reduced more effectively.

The degree of deterioration (loss of capacity of capacitor, etc.) in the light sources 203 and circuit elements may differ between the lighting units 204 because of removal of light sources 203 or selection control to select the light sources that are lit up. Even in these cases, however, it is possible to reduce start-up variation in the start-up timing and in the speed of increase in light output between lighting units 204 by performing feedback control so that lighting current I201 increases gradually at start-up.

Embodiment 3

Figure 8:
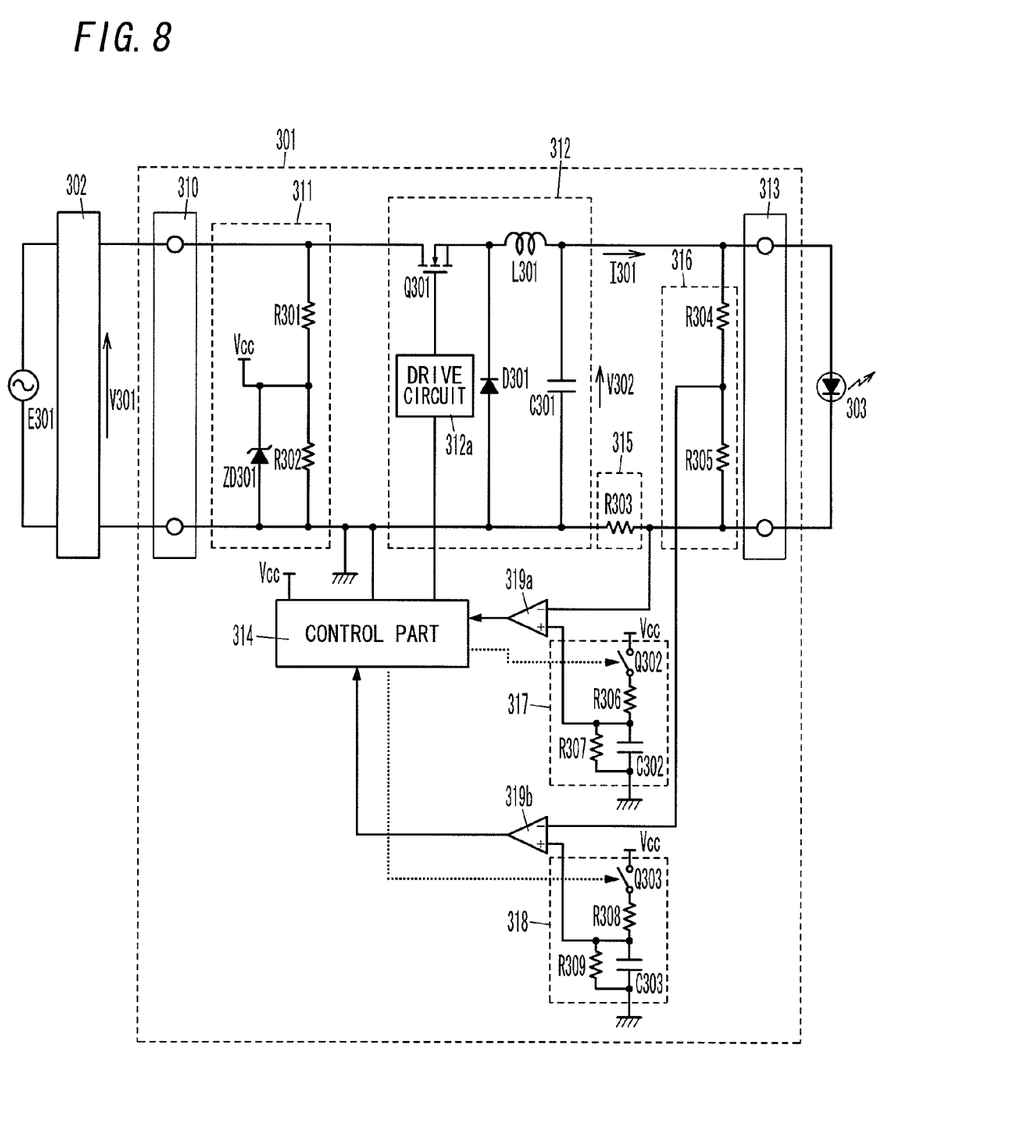
FIG. 8 is a circuit configuration diagram of an organic EL element lighting device of Embodiment 3 of the present invention.

FIG. 8 shows a circuit configuration diagram of an organic EL element lighting device of the present embodiment. The organic EL element lighting device of the present embodiment includes a power supply unit 301 and a constant voltage unit 302. The power supply unit 301 includes an input part 310, a control power circuit 311, a step-down chopper circuit 312, an output part 313, a control part 314, a current detection part 315, a voltage detection part 316, a target current setting part 317 and a target voltage setting part 318.

The constant voltage unit 302 is connected to an AC power source E301, and converts an AC voltage of the AC power source E301 to a DC voltage V301 and supplies the DC voltage V301 to the power supply unit 301.

The input part 310 is connected to the constant voltage unit 302, and receives the DC voltage V301. The control power circuit 311 includes a series circuit formed of resistors R301 and R302 and a zener diode ZD301 that is connected in parallel to resistance R302, generates a drive voltage Vcc from the DC voltage V301, and supplies the drive voltage Vcc to the control part 314, target current setting part 317 and target voltage setting part 318.

The step-down chopper circuit 312 (current supply part) includes a switching element Q301, a choke coil L301, a capacitor C301, a diode D301 and a drive circuit 312a. A series circuit formed of the switching element Q301, choke coil L301 and capacitor C301 is connected between the terminals of the input part 310, and the diode D301 for regeneration is connected in parallel to a series circuit formed of the choke coil L301 and capacitor C301. The drive circuit 312a turns switching element Q301 on and off, thereby stepping down the DC voltage V301 and generating a lighting voltage V302 across both ends of the capacitor C301.

The light source 303 is connected in parallel to the capacitor C301 via the output part 313, and when the lighting voltage V302 is generated, lighting current I301 is supplied to the light source 303, lighting up the light source 303. The light source 303 includes one or more organic EL elements.

The current detection part 315 including a resistor R303 is inserted into the supply path of the lighting current I301, and outputs the voltage across both ends of the resistor R303 to the inverting input terminal of the comparator 319a as the detected value of the lighting current I301.

The target value of the lighting current I301 is inputted from the target current setting part 317 to the non-inverting input terminal of the comparator 319a. The target current setting part 317 (target setting part), which sets the target value of the lighting current I301, comprises: a series circuit formed of a switching element Q302, a resistor R306 and a capacitor C302; and a resistor R307 connected in parallel to the capacitor C302. The series circuit formed of the switching element Q302, the resistor R306 and the capacitor C302 is connected at one end to the control power circuit 311, with the other end being grounded, and receives a drive voltage Vcc from the control power circuit 311. The control part 314 performs switching control of the switching element Q302, and when the switching element Q302 is on, the capacitor C302 is charged by the drive voltage Vcc. The connection point between the resistor R306 and the capacitor C302 is connected to the non-inverting input terminal of the comparator 319a, and the voltage across both ends of the capacitor C302 is outputted as the target value of the lighting current I301.

The voltage detection part 316 includes a series circuit formed of resistors R304 and R305, connected in parallel to the capacitor C301. The partial value of the lighting voltage V302 from resistors R304 and R305 is outputted to the inverting input terminal of the comparator 319b as the detected value of the lighting voltage V302.

The target value of the lighting voltage V302 is inputted from the target voltage setting part 318 to the non-inverting input terminal of the comparator 319b. The target voltage setting part 318 sets the target value of the lighting voltage V302, and comprises: a series circuit formed of a switching element Q303, a resistor R308 and a capacitor C303; and a resistor R309 connected in parallel to the capacitor C303. The series circuit formed of the switching element Q303, the resistor R308 and the capacitor C303 is connected at one end to the control power circuit 311, with the other end being grounded, and receives the drive voltage Vcc from the control power circuit 311. The control part 314 performs the switching control of the switching element Q303, and when the switching element Q303 is on, the capacitor C303 is charged by the drive voltage Vcc. The connection point between the resistor R308 and the capacitor C303 is connected to the non-inverting input terminal of the comparator 319b, and the voltage across both ends of the capacitor C303 is outputted as the target value of the lighting voltage V302.

The control part 314 controls the drive circuit 312a based on outputs from the comparators 319a and 319b, thereby performing switching control of the switching element Q301, and switching back and forth between feedback control of the lighting voltage V302 and feedback control of the lighting current I301.

Next, the start-up operations of the organic EL element lighting device of the present embodiment are explained. At start-up, the control part 314 first performs feedback control of the voltage V302, and then switches to feedback control of the lighting current I301.

At start-up, the control part 314 performs feedback control of the lighting voltage V302 based on outputs from the comparator 319b. First, the control part 314 turns on the switching element Q303. Turning on the switching element Q303 causes the capacitor C303 to be charged. At this time, the voltage across both ends of the capacitor C303 is gradually increased according to the resistance values of the resistors R308 and R309 and a time constant determined by the capacity of capacitor C303. That is, the target voltage setting part 318 gradually increases the target value of the lighting voltage V302. The lighting voltage V302 applied to the light source 303 is thus gradually increased.

When the lighting voltage V302 reaches a predetermined value that is equal to or less than the lighting initiation voltage Vs of the light source 303, the control part 314 turns on the switching element Q302, and then moves into performing feedback control of the lighting current I301 based on the output of the comparator 319a. Turning on the switching element Q302 causes the capacitor C302 to be charged. At this time, the voltage across both ends of the capacitor C302 is gradually increased in accordance with the resistance values of the resistors R306 and R307 and a time constant determined by the capacity of the capacitor C302. That is, the target current setting part 317 has a sweep period Tsw for gradually increasing the target value of the lighting current I301. Therefore, the lighting current I301 supplied to the light source 303 is thus gradually increased, lighting up the light source 303.

Thus, in the present embodiment, there is provided a period during which a voltage at or below the lighting initiation voltage Vs of the light source 303 is applied to the light source 303 before the light source 303 is lit up (before sweep period Tsw), during which time the capacity component of the organic EL element becomes charged to a certain extent. It is thus possible to reduce inrush current (surge current) during lighting start-up.

Moreover, since feedback control of the lighting current I301 is performed during start-up of the light source 303 so that the lighting current I301 increases gradually, it is possible to reduce start-up variation as in Embodiment 1.

Moreover, since feedback control in the present embodiment is performed on both the lighting voltage V302 and the lighting current I301, it is possible to supply the lighting voltage V302 and the lighting current I301 to the light source 303 with great precision and with little variation. Since feedback control of both the lighting voltage V302 and the lighting current I301 is performed using a single step-down chopper circuit 312, moreover, the component count and device size can be reduced.

It is also possible to switch from feedback control of the lighting voltage V302 to feedback control of the lighting current I301 even when the lighting voltage V302 is equal to or greater than the lighting initiation voltage Vs of the light source 303. In this case, surge current at start-up can be reduced because the lighting voltage V302 can be increased at the desired speed irrespective of variations in the V-I characteristics of the organic EL element making up the light source 303.

The target current setting part 317 and the target voltage setting part 318 can also be configured as microcomputers, and programmed to gradually increase the target value of the lighting voltage V301 and the target value of the lighting current I301.

Embodiment 4

Figure 9:
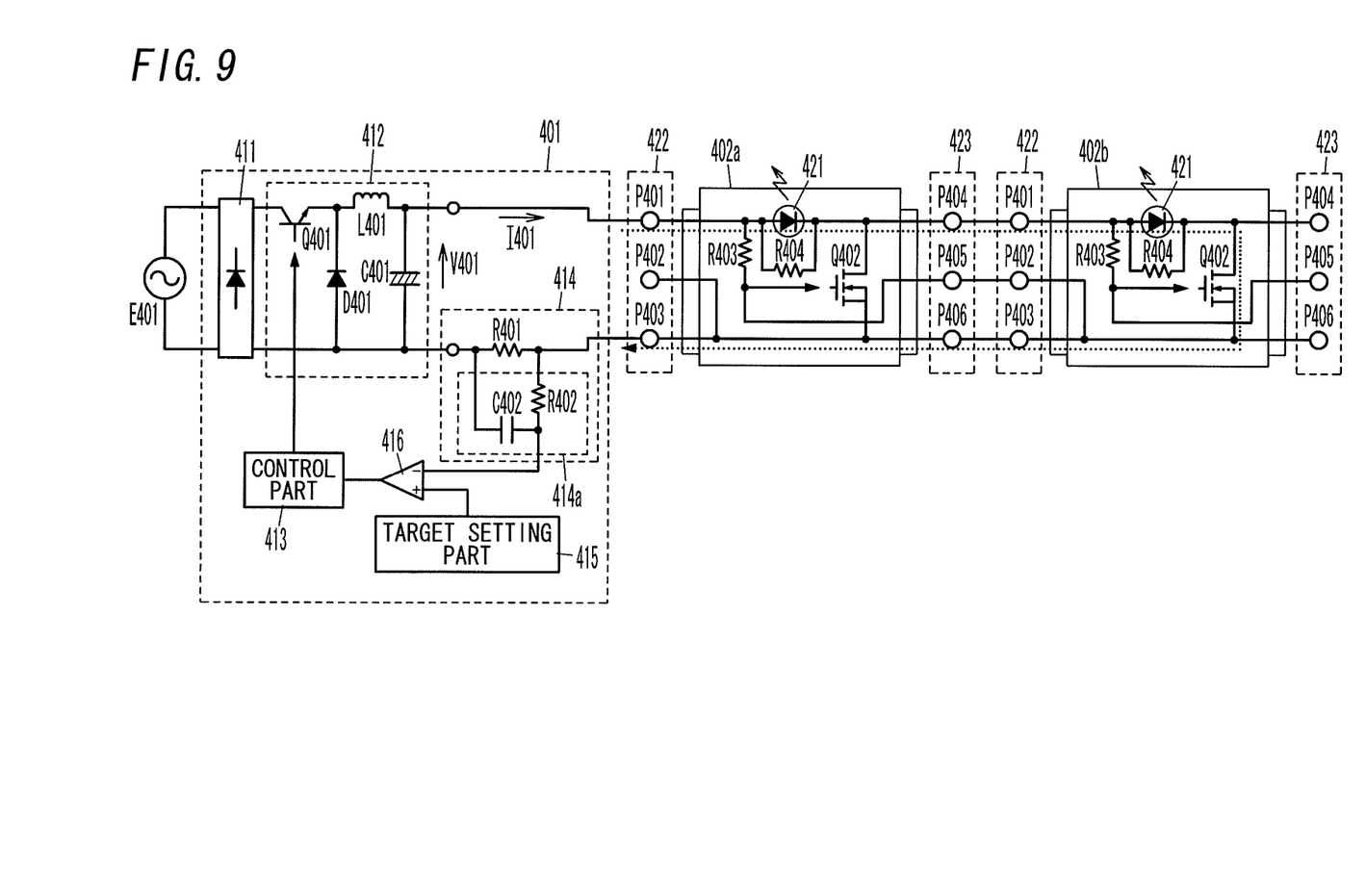
FIG. 9 is a circuit configuration diagram of an organic EL element lighting device of Embodiment 4 of the present invention.

FIG. 9 shows a circuit configuration diagram of an organic EL element lighting device 401 of the present embodiment.

The organic EL element lighting device 401 of the present embodiment includes a rectifying circuit 411, a step-down chopper circuit 412, a control part 413, a current detection part 414, a target setting part 415 and a comparator 416.

The rectifying circuit 411, which is connected to AC power source E401, rectifies and smooths the AC voltage of the AC power source E401 and outputs the resulting voltage to the step-down chopper circuit 412.

The step-down chopper circuit 412 (current supply part) includes a switching element Q401, an inductor L401, a capacitor C401 and a diode D401. A series circuit formed of the switching element Q401, the inductor L401 and the capacitor C401 is connected between the output terminals of the rectifying circuit 411, and the diode D401 for regeneration is connected in parallel to a series circuit formed of the inductor L401 and the capacitor C401. The lighting voltage V401 is generated across both ends of the capacitor C401 when the control part 413 performs switching control on the switching element Q401.

The light source 402 is connected between the terminals of the capacitor C401, and the light source 402 is lit up when the lighting current I401 is supplied from the step-down chopper circuit 412.

The current detection part 414 includes a resistor R401 and a lowpass filter 414a, and outputs the voltage across both terminals of the resistor R401 to the inverting input terminal of the comparator 416 as the detected value of the lighting current I401.

The target setting part 415 is connected to the non-inverting input terminal of the comparator 416, and the target value of the lighting current I401 is outputted from the target setting part 415.

By performing switching control of the switching element Q401 based on the output of the comparator 416, the control part 413 performs feedback control on the lighting current I401 so that the lighting current I401 matches the target value.

At start-up, the target setting part 415 gradually increases the target value of the lighting current I401 from zero to the target value during steady lighting (sweep period Tsw). By performing feedback control so that the detected value of the lighting current I401 matches the target value, the control part 413 gradually increases the lighting current I401, lighting up the light source 402. In this way, surge current can be controlled and start-up variation can be reduced as in Embodiment 1.

The current detection part 414 of the present embodiment is provided with a lowpass filter 414a. The lowpass filter 414a includes a series circuit formed of a resistor R402 and a capacitor C402, connected in parallel to resistor R401, and the connection point between the resistor R402 and the capacitor C402 is connected to the inverting input terminal of the comparator 416. The lowpass filter 414a is set so as to allow the detected value of the lighting current I401 to pass through, while cutting the surge current. As shown in FIG. 12, in an organic EL element, the lighting initiation voltage Vf1 at which a current starts to flow is a somewhat high voltage value. Therefore, even if the lighting current I401 is raised gradually at start-up, there is a risk that the voltage rises sharply to the lighting initiation voltage Vf1, thereby causing a flow of surge current in order to charge the capacity component of the organic EL element. However, because the lowpass filter 414a is provided in the present embodiment to cut the surge current, the control part 413 can prevent malfunctions due to surge current.

Moreover, the light source 402 of the present embodiment is configured so as to allow electrical connection to another light source 402, and the light sources 402 can be connected in series. When the light sources 402 are distinguished individually, they are labeled light source 402a, 402b, with the light source 402a being connected to the organic EL element lighting device 401, while light source 402b is connected to the light source 401a.

The light source 402 is provided with an organic EL element 421, a resistor R403, a switching element Q402, a source terminal 422, and an expansion terminal 423. The source terminal 422 includes a line terminal P401 and GND terminals P402 and P403, and the expansion terminal 423 includes a line terminal P404, a gate terminal P405 and a GND terminal P406.

The line terminal P401 of the light source 402a is connected to the positive terminal of the capacitor C401, and GND terminals P402, P403 and P406 are connected to the negative terminal of capacitor C401 via the resistor R401. The organic EL element 421 is connected between the line terminals P401 and P404, and the resistor R404 is connected in parallel to the organic EL element 421. The switching element Q402 is connected between the line terminal P404 and GND terminal P406, while the gate terminal of the switching element Q402 is connected to the line terminal P401 via the gate terminal P405 and the resistor R403.

The source terminal 422 of the light source 402b is connected to the expansion terminal 423 of the light source 402a. Specifically, the line terminal P401 of the light source 402b is connected to the line terminal P404 of the light source 402a. The GND terminal P402 of the light source 402b is connected to the gate terminal P405 of the light source 402a. The GND terminal P403 of the light source 402b is connected to the GND terminal P406 of the light source 402a. However, no other light source 402 is connected to the expansion terminal 423 of the light source 402b.

In this configuration, because the gate terminal P405 of the light source 402a is connected to the GND terminal P403 of the light source 402b, the gate terminal of the switching element Q402 of the light source 402a is grounded, and the switching element Q402 is turned off. On the other hand, when the voltage V401 is applied via the light source 402a to the gate terminal of the switching element Q402 of the light source 402b, the switching element Q402 is turned on.

That is, this is configured so that when a source terminal 422 of another light source 402 is connected to the expansion terminal 423, the switching element Q402 turns off, and power is supplied to the light source 402 connected to expansion terminal 423. Thus, light sources 402 can be connected in series simply by linking the light sources 402 together. The short/open circuit of Embodiment 1 is thus not necessary in the present embodiment.

Moreover, since the same lighting current I401 is supplied to both light sources 402, the start-up variation between light sources 402 can be reduced.

Embodiment 5

Figure 10:
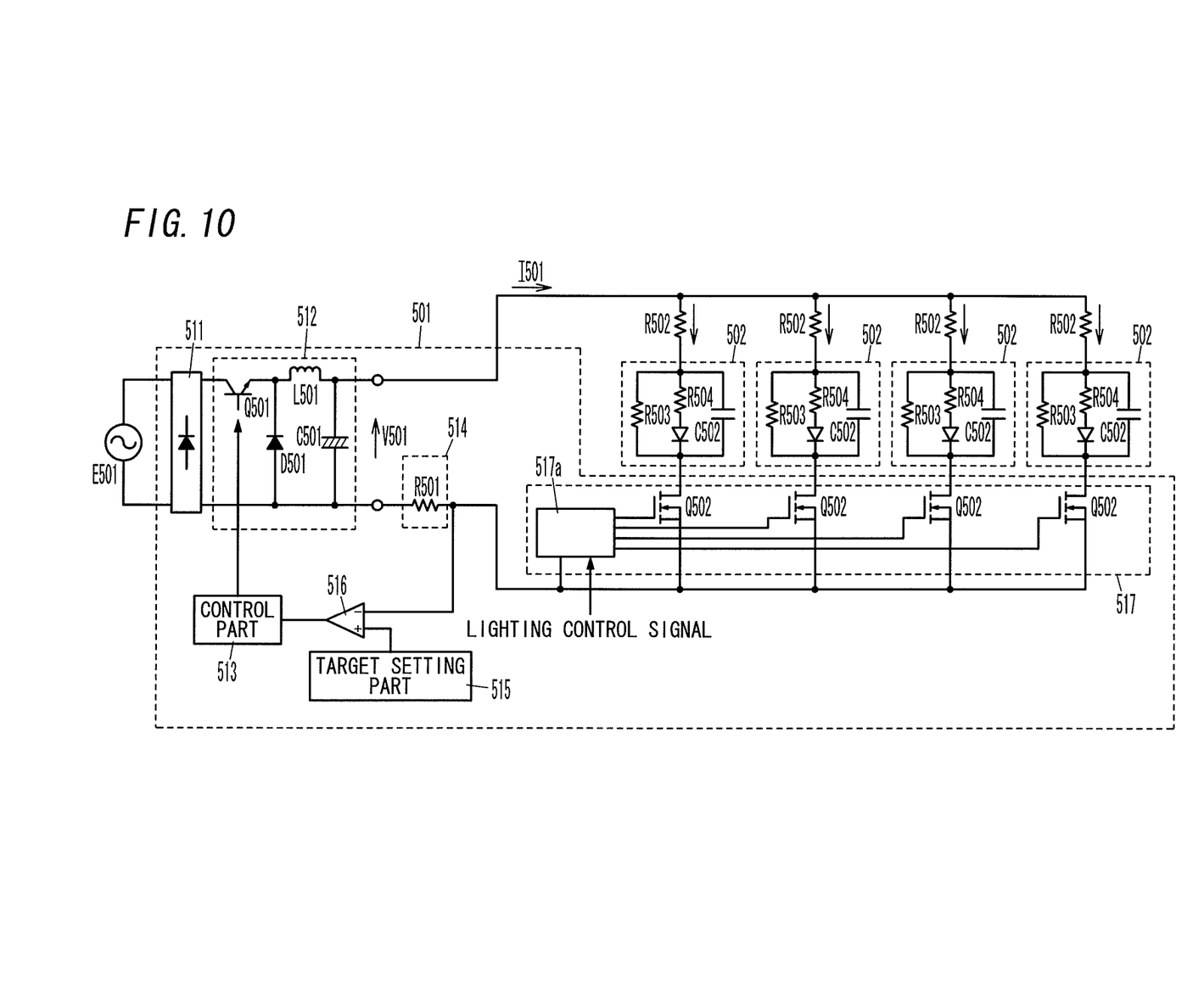
FIG. 10 is a circuit configuration diagram of an organic EL element lighting device of Embodiment 5 of the present invention.

FIG. 10 is a circuit configuration diagram of an organic EL element lighting device 501 of the present embodiment.

The organic EL element lighting device 501 of the present embodiment includes a rectifying circuit 511, a step-down chopper circuit 512, a control part 513, a current detection part 514, a target setting part 515, a comparator 516 and a lighting count control part 517.

Rectifying circuit 511 is connected to AC power source E501, and rectifies and smooths the AC voltage from AC power source E501 and outputs the resulting voltage to the step-down chopper circuit 512.

The step-down chopper circuit 512 (current supply part) includes a switching element Q501, an inductor L501, a capacitor C501 and a diode D501. A series circuit formed of the switching element Q501, the inductor L501 and the capacitor C501 is connected between the output terminals of the rectifying circuit 511, and the diode D501 for regeneration is connected in parallel to a series circuit formed of the inductor L501 and the capacitor C501. The control part 513 performs switching control of the switching element Q501, thereby generating a lighting voltage V501 across both ends of the capacitor C501.

Four series circuits each formed of a resistor R502, a light source 502 and a switching element Q502 are connected in parallel to the capacitor C501. The light sources 502 are each composed of one or more organic EL elements, and FIG. 10 illustrates equivalent circuits each comprising a leak resistor R503, a series equivalent resistor R504 and an equivalent capacity C502 connected in parallel. Each light source 502 is of the same type and size. The lighting current I501 supplied from the step-down chopper circuit 512 is shunted to the light sources 502, lighting up the light sources 502.

The lighting count control part 517 includes four switching elements Q502 and a switch control part 517a. Each switching element Q502 is serially connected to a light source 502, and the switch control part 517a controls the on and off of the switching elements Q502 based on lighting control signals inputted from outside the device. When a switching element Q502 is turned off, the current pathway of the light source 502 serially connected to this switching element Q502 is blocked, and the light is extinguished. Thus, the switch control part 517a can control the number of light sources 502 that are lit by turning switching elements Q502 on and off based on lighting control signals. The light sources 502 are also configured detachably, and the light sources 502 are connected in parallel. Therefore, even if a light source 502 has been removed, a current can be supplied to light up another light source 502.

The current detection part 514 includes a resistor R501, and the voltage across terminals of the resistor R501 is outputted to the inverting input terminal of the comparator 516 as the detected value of the lighting current I501.

The target setting part 515 is connected to the non-inverting terminal of the comparator 516, and the target value of the lighting current I501 is outputted from the target setting part 515.

The control part 513 performs switching control of the switching element Q501 based on the output of the comparator 516, thereby performing feedback control of the lighting current I501 so that the lighting current I501 matches the target value.

At start-up, the target setting part 515 gradually increases the target value of the lighting current I501 from zero to the target value during steady lighting (sweep period Tsw). Since the control part 513 performs feedback control so that the detected value of the lighting current I501 matches the target value, the lighting current I501 rises gradually, lighting up light source 502. It is thus possible to control surge current and reduce start-up variation as in Embodiment 1.

The light sources 502 are connected in parallel in the present embodiment. Thus, assuming that the lighting voltage V501 is the same during steady lighting, the surge current outputted from organic EL element lighting device 501 will be lower the smaller the number of light sources 502 that are lit up, and the circuit stress will be reduced. Thus, in the present embodiment, the target setting part 515 shortens the sweep period Tsw as the number of light sources 502 that are lit up decreases. The target setting part 515 assesses the number of light sources 502 that are lit up, based on lighting control signals, on the mechanical connection status of the light sources 502 by attachment detection switches, and on changes in the electrical characteristics of this lighting voltage V501 and lighting current I501, and uses this information to determine sweep period Tsw. A graduated system is also possible in which a specific sweep period Tsw is set if the number of light sources 502 that are lit up is equal to or greater than a specific number, and a sweep period Tsw of zero is set if the number is below the specific number.

Thus, the amount of time taken from initial start-up until a steady lighting state is reached can be decreased by shortening sweep period Tsw as the number of light sources 502 that are lit up decreases.

Embodiment 6

Figure 11:
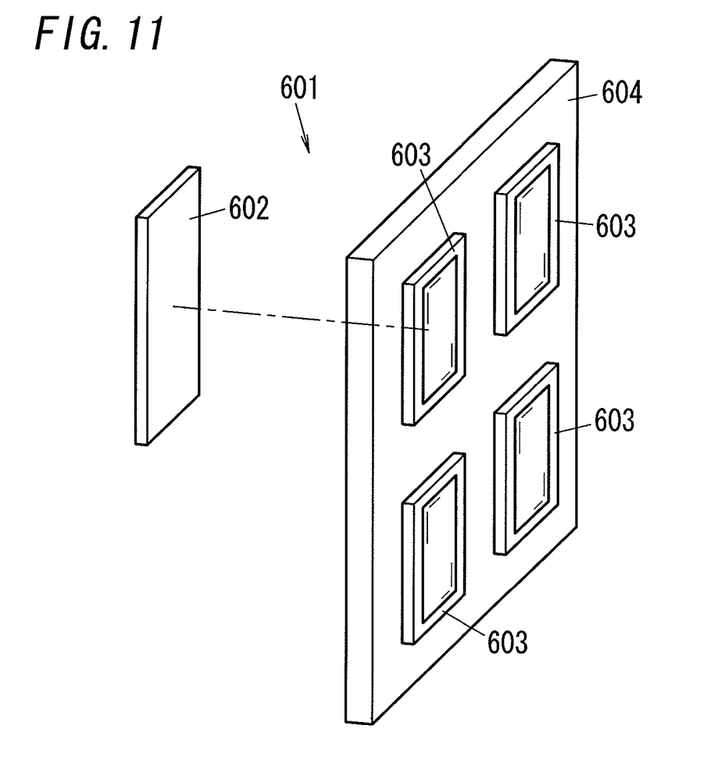
FIG. 11 is a schematic configuration diagram of a lighting fixture of Embodiment 6 of the present invention.

FIG. 11 shows a schematic configuration diagram of a lighting fixture 601 of the present embodiment.

The lighting fixture 601 of the present embodiment is provided with an organic EL element lighting device 602 according to any one of Embodiments 1 to 5, together with panel-type light sources 603 having organic EL elements.

The organic EL element lighting device 602 and a plurality of (four in the drawing) light sources 603 are attached to a thin fixture body 604. The organic EL element lighting device 602 is attached from the reverse side of the fixture body 604, and is electrically connected to each light source 603 attached to the front side of the fixture body 604. Each light source 603 is lit up by a lighting current supplied from the organic EL element lighting device 602.

Further, the lighting fixture 601 is provided with an organic EL element lighting device 602 according to any one of Embodiments 1 to 5. Accordingly, as in Embodiment 1 to 5, the effect of allowing surge current to be reduced at start-up and allowing start-up variation to be controlled can be obtained. As a result, it is possible to provide a lighting fixture 601 with high reliability.

Because such a lighting fixture 601 can be made thin, it is suitable as indoor lighting for example.

Moreover, the light sources 603 are each freely detachable, and the organic EL element lighting device 602 can respond to the attachment and detachment of the light sources 603 and control the lighting and extinguishing of the light sources 603 individually.

Although the present invention has been described with reference to certain preferred embodiments, numerous modifications and variations can be made by those skilled in the art without departing from the true spirit and scope of this invention, namely claims.

The invention claimed is:

1. An organic EL element lighting device comprising:
   a current supply part that supplies lighting current to a light source which is formed of one or more organic EL elements and is connected between output terminals of the current supply part;
   a current detection part that detects the lighting current;
   a target setting part that sets a target value of the lighting current; and
   a control part that is configured to perform feedback control of the lighting current by controlling the current supply part so that a detected value of the current detection part matches the target value,
   wherein the target setting part has a sweep period during which the target value is gradually increased at start-up of the light source.

2. The organic EL element lighting device according to claim 1, wherein the current detection part is provided with a lowpass filter that lets through the detected value of the lighting current.

3. The organic EL element lighting device according to claim 1, wherein the current supply part comprises a plurality of current supply parts, each of which supplying the lighting current to a different light source,
   the control part is configured to perform feedback control to match each lighting current to the target value, and
   the target setting part sets the same target value for each lighting current.

4. The organic EL element lighting device according to claim 3, further comprising a plurality of lighting units, each of which having the light source, the current supply part and the control part,
   wherein the current supply part generates the lighting current from an input power source, and
   each of the plurality of lighting units is provided with a supply terminal that is freely detachable from the input power source, and a target value input terminal that is freely detachable from the target setting part.

5. The organic EL element lighting device according to claim 1, wherein the light source comprises a plurality of light sources connected in series, and the organic EL element lighting device further comprises short/open circuit means for shorting and opening circuits between both terminals of each of the plurality of light sources.

6. The organic EL element lighting device according to claim 1, wherein the target setting part shortens the sweep period as the number of the organic EL elements supplied with the lighting current decreases.

7. The organic EL element lighting device according to claim 1, wherein the target setting part shortens the sweep period as a degree of modulation of the light source becomes lower.

8. The organic EL element lighting device according to claim 1, wherein the control part has, before the sweep period, a period during which a voltage at or below a lighting initiation voltage of each of the organic EL elements is generated across the output terminals of the current supply part.

9. A lighting fixture comprising:
   the organic EL element lighting device according to claim 1;
   a light source which is formed of one or more organic EL elements and is lit by the organic EL element lighting device; and
   a fixture body to which are attached the organic EL element lighting device and the light source.

* * * * *